(12) United States Patent
Bresolin

(10) Patent No.: US 6,565,330 B1
(45) Date of Patent: May 20, 2003

(54) HEATING AND PUMPING DEVICE FOR LIQUIDS, IN PARTICULAR FOR WATER OF AQUARIUMS

(75) Inventor: Valerio Bresolin, Vicenza (IT)

(73) Assignee: Hydor SRL (IT)

(*) Notice: Subject to any disclaimer, the term of this patent is extended or adjusted under 35 U.S.C. 154(b) by 0 days.

(21) Appl. No.: 09/869,076

(22) PCT Filed: Dec. 2, 1999

(86) PCT No.: PCT/IT99/00396

§ 371 (c)(1),
(2), (4) Date: Jun. 22, 2001

(87) PCT Pub. No.: WO00/38509

PCT Pub. Date: Jul. 6, 2000

(30) Foreign Application Priority Data

Apr. 10, 2000 (IT) ............................................. 09/869076

(51) Int. Cl.[7] .......................... A01K 63/04; F04B 35/04
(52) U.S. Cl. ............... 417/313; 417/423.3; 417/423.14; 119/262
(58) Field of Search ................................. 119/259, 262, 119/245; 417/313, 423.1, 423.3, 423.7, 423.9, 423.14, 53

(56) References Cited

U.S. PATENT DOCUMENTS

| 3,511,376 A | | 5/1970 | Sesholtz |
| 3,635,344 A | | 1/1972 | Lovitz |
| 3,892,663 A | | 7/1975 | Wiedenmann |
| 5,714,814 A | * | 2/1998 | Marioni ....................... 310/87 |
| 5,749,715 A | | 5/1998 | Laing |

FOREIGN PATENT DOCUMENTS

GB         2 114 720 A       8/1983

* cited by examiner

Primary Examiner—Charles G. Freay
(74) Attorney, Agent, or Firm—Griffin & Szipl, P.C.

(57) ABSTRACT

A heating and pumping device for liquids, in particular for water of aquariums, the device comprising a pump (24) having a pump body (32) and a thermo-heating element (26) having a thermo-heating body (60). There is a casing (22) which contains both the pump (24) and the thermo-heating element (26) such that a passage section (102) for water is defined between the thermo-heating element (26) and the casing (22). To seal the electrical parts of the thermo-heating element (26) and to prevent damage, a sole sealed zone (100) filled with resin is created between the pump body (32) and the thermo-heating body (60). This resin filled sole sealed zone (100) obviates the need for using other less effective sealing elements and gaskets.

15 Claims, 3 Drawing Sheets

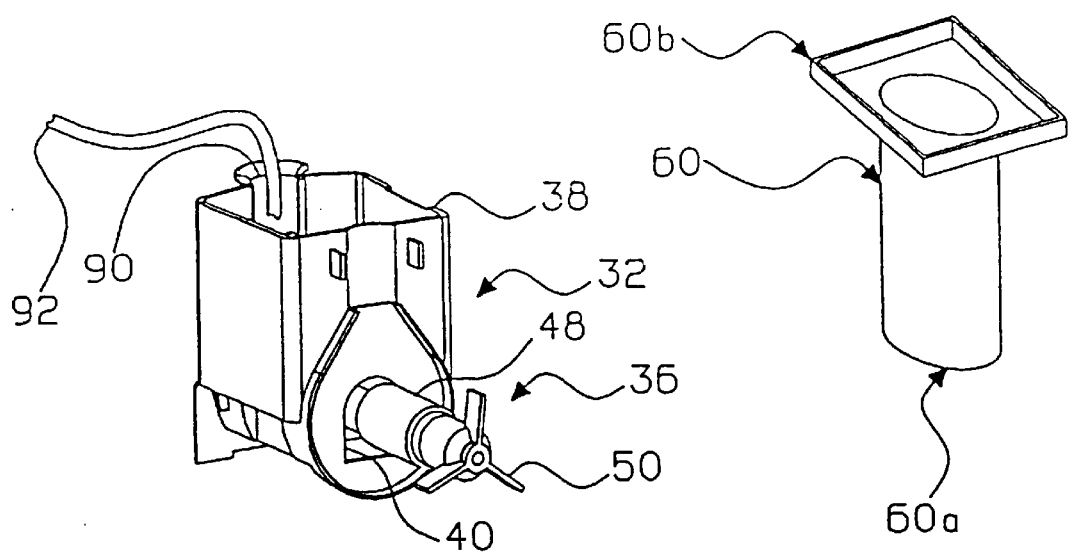
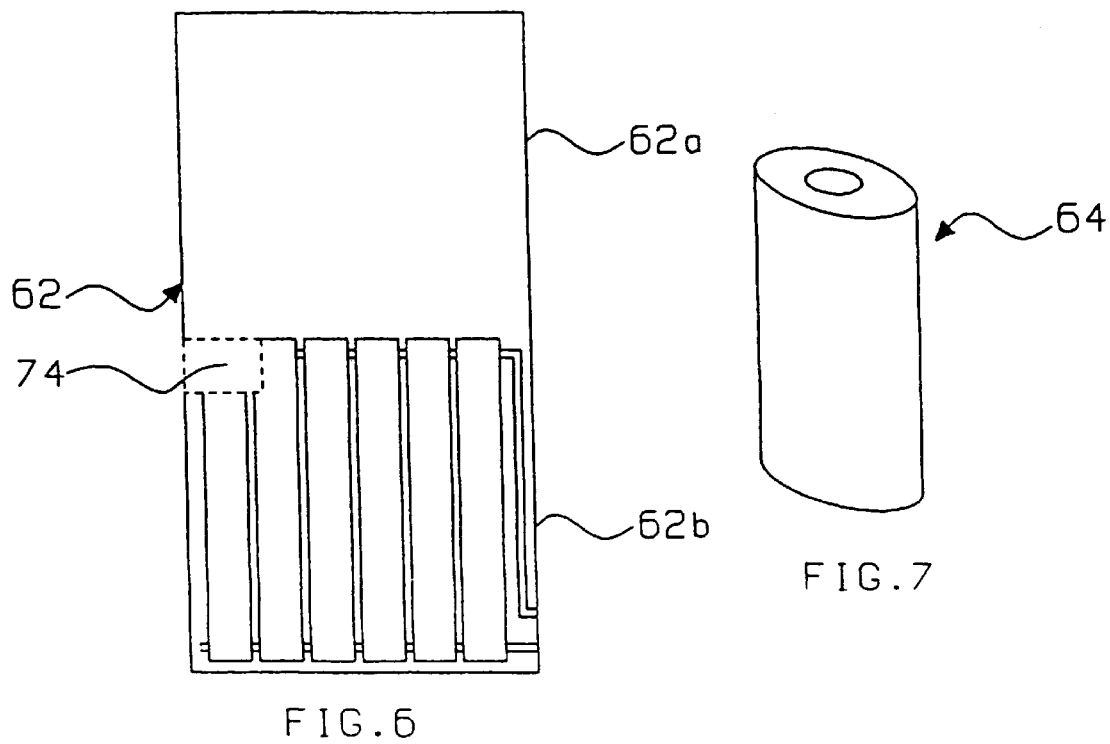

HEATING AND PUMPING DEVICE FOR LIQUIDS, IN PARTICULAR FOR WATER OF AQUARIUMS

FIELD OF THE INVENTION

The present invention relates to a heating and pumping device for liquids, in particular for water of aquariums, of the type comprising a pump and a thermo-heating element.

BACKGROUND OF THE INVENTION

Devices which consist of a pump used for circulating water, coupled to a thermo-heater allowing the water to be heated, are known. These devices can also be used in aquariums, in particular domestic ones in which it is necessary to provide a pump for circulating water in order to filter it, previously inserting a filter in the recirculating circuit; this permits also to oxygenate the water and to maintain the optimal conditions inside the aquarium for the surviving of fishes contained therein. Furthermore, for the same reason, it is necessary to maintain the water temperature between predetermined limits by a thermo-heater which depends on the type of fishes to be bred. Obviously the aquarium must contain fishes which necessitate water of the same type (salt or fresh water) which must be maintained at the same temperature.

On the market different kinds of pump exist, most of them of the centrifugaltype powered by an electric motor. Also different kinds of thermoheater exist, all of them utilizing an electric resistance for heating the water. Many improvements are made for both the pump and thermoheater, but always using these two fundamental elements.

An apparatus for pumping and filtering water for aquariums is disclosed in U.S. Pat. No. 3,635,344 filed on Aug. 21, 1970. This document concerns a pump and filter unit to be mounted on the wall of an aquarium by means of hooks. The unit comprises a housing mounted on the outside of the aquarium which contains a removable filter tank for filtering the water. A space is defined between the housing and the filter tank wherein, at the bottom, there are an electric heater for heating the water and a thermostat for controlling the water temperature. The unit also comprises a screw-type elevator mechanically connected to an electric motor placed on the top the elevator. The elevator is immersed in water so that the water is pumped into the filter tank and then it comes out from the bottom of the filter and it fills the space defined between the housing and the filter tank. The water is heated and goes into the aquarium by means of spillways made in the hooks. Producing the pump and the thermoheater separately involves high industrial costs and a long manufacturing time.

Bear in mind that these two elements in an aquarium are inconvenient and cumbersome, these troubling the field of vision, that is, they obstruct the clear visual inside the aquarium although these elements are located near the aquarium walls.

The thermo-heater has to measure the real temperature of water, hence it must not be positioned near the areas where water is prevented from circulating; therefore it is necessary to choose the right place for it that usually is near the pump.

Considering now the thermoheaters of the prior art, they generally consist of glass casing inside which an electric resistance is contained. Consequently they can be damaged because of the fragility of the material used; another drawback consists of the difficulty in providing suitable gaskets for preventing the water from penetrating inside which hinders the correct operation. This involves making suitable housing seats for the gaskets, using gaskets which allow a high degree of sealing and finally an assembly cycle to mount the whole. Finally, the temperature sensor of the thermoheater interferes with the heat which rises upwards in different ways according to the manner the thermoheater is positioned; usually the setting is made when the thermoheater is vertically positioned, therefore it is necessary to put it always in the upright position.

SUMMARY OF THE INVENTION

The aim of the invention is therefore to conceive a device which eliminates the drawbacks cited above with reference to the prior art. The device made in such way must be simple, reliable and cheap.

The aim is achieved by means of a device of the above-mentioned type comprising a pump and a thermoheater element, characterized in that said pump and said thermoheater element are contained inside a casing. The device becomes very compact, including in a sole apparatus both the function of the pump and the thermo-heater so that many advantages derive: easy to produce, quick to manufacture, troubles in the field of vision reduced to a minimum and cost lower than the sum of the individual costs of the pump and thermo-heater.

Because of the integration between the thermoheater and the pump, there is no problem in locating the thermoheater in the right position. In particular, between the thermoheater and the casing a passage section for water is defined. The thermoheater element comprises a hollow body inside which resistance means are housed, this body is integral with and in communication to the pump body which houses the statoric part of the pump in order to form a sole sealed zone.

In such a way the principle components of the device are few, so reducing the final cost of the product. Filtering means must also be placed between the thermo-heater hollow body and the casing, this means preferably consists of a cartridge in a porous material so extending the functions of the device making it more appreciable, above all, for the customers who want to reduce the total expense of an aquarium.

In order to seal the pump body with the hollow body of the thermoheater element, so forming said sealed zone, a resin is used which makes unnecessary the use of sealing elements or gaskets to prevent water from penetrating inside the thermoheater simplifying further the assembly and production phases, guaranteeing at the same time a perfect seal.

BRIEF DESCRIPTION OF THE DRAWINGS

These and other advantages result more evidently from the following detailed description of a preferred embodiment made for an illustration and not limiting scope with reference to the following enclosed drawings in which:

FIG. 3 is an enlarged view of a particular of FIG. 2;

FIG. 4 is a perspective view of the pump body containing the rotoric part partially moved;

FIG. 5 is a perspective view of the hollow body of the thermo-heater element;

FIG. 6 is a top view of the electric resistance;

FIG. 7 is a perspective view of the presser.

DETAILED DESCRIPTION OF THE PREFERRED EMBODIMENT

Figure 1:
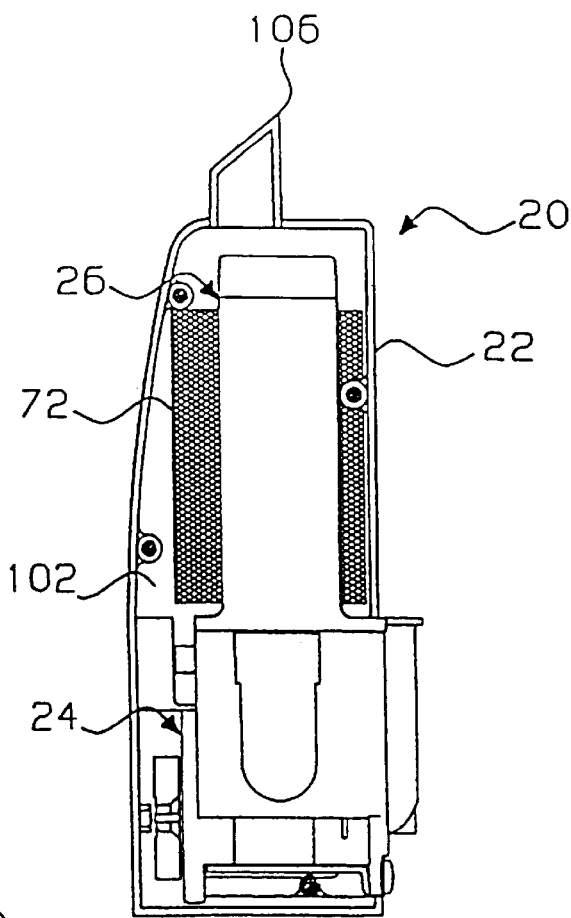
FIG. 1 is a schematic elevation cross-section of a device according to the present invention.

In FIG. 1 a filtering and pumping device is indicate with 20. The device 20 comprises a casing 22 inside which a pump 24 is housed. The pump is connected to a thermo-heater element 26.

Figure 2:
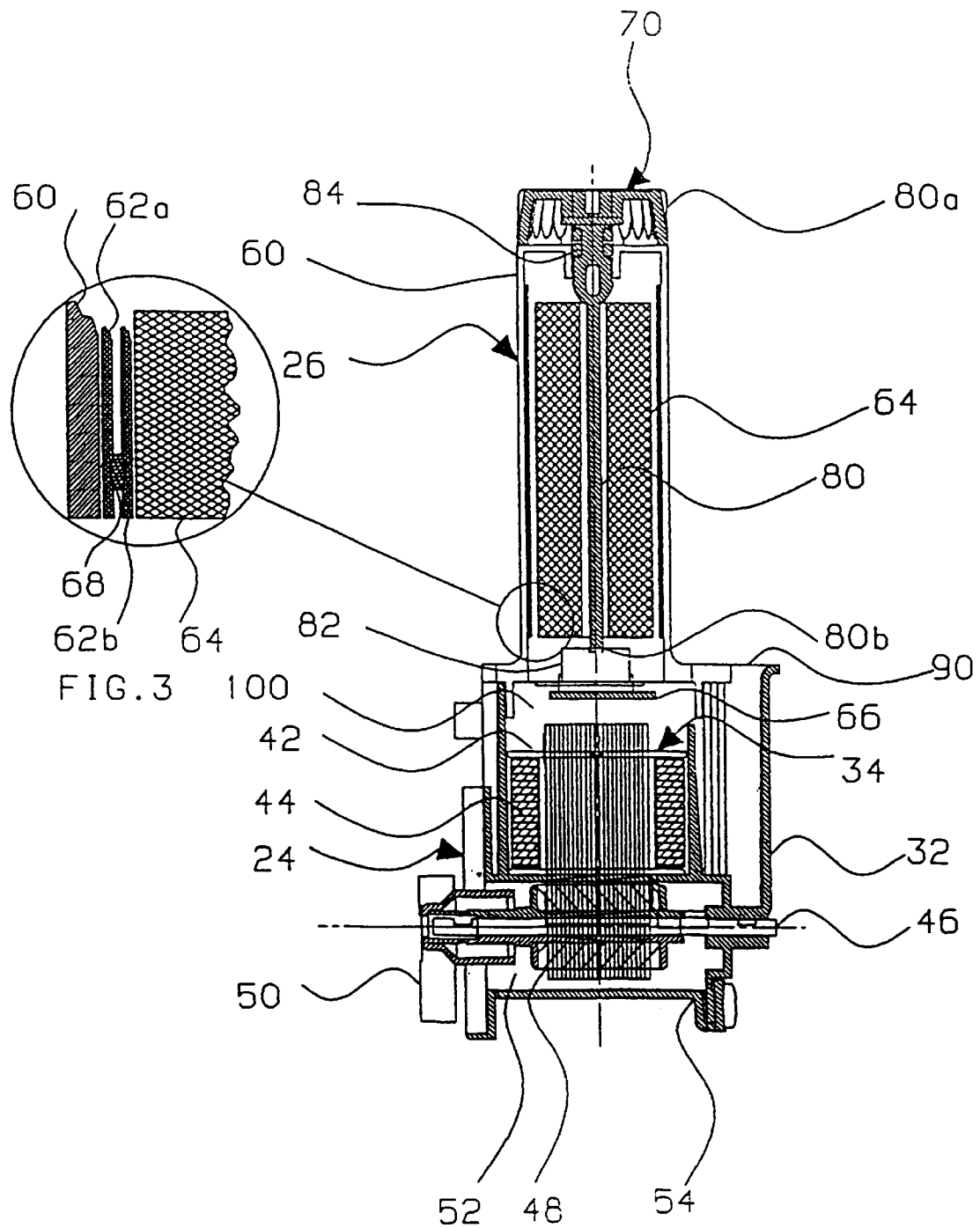
FIG. 2 is an elevation cross-section of the device of FIG. 1 without the casing.

From FIGS. 2 and 4, one notes that the pump 24 comprises a pump body 32, a statoric part 34 and a rotoric part 36. The pump body is essentially parallelepipedic and has a first housing 38 designed to house the statoric part 34 of the pump 24 and a second housing 40 designed to house the rotoric part 36 of the pump 24. The statoric part 34 consists essentially of a support 42 around which an electric winding 44 is provided, whereas the rotoric part 36 comprises a pin 46 on which a rotary impeller 50 is mounted and connected to a permanent magnet 48 with double-polarity. The water flows into the second housing 40 and then to the rotoric part 36 of the pump 24 by means of an entry opening 52 which can be closed by a manually movable tongue which acts like a valve enabling the circulating water flow to vary its rate.

From FIGS. 2, 3 and 5, it can be seen that the thermo-heater element 26 comprises an hollow and cylindric thermo-heating body 60, an electric resistance 62, a pressing element 64, a thermostat 66, a temperature sensor 68 and a temperature controlling mechanism 70. The thermo-heating body 60 has two opposite ends 60a,60b: the first end 60a is closed, whereas the second end 60b widens forming a square inlet.

From FIGS. 2, 3 and 6, it can be noted that the electric resistance 62 is wound up inside the thermo-heating body 60, the resistance 62 consists of a insulating material sheet on which two parts are identified: a first half 62a, and a second half 62b which comprises a PTC-type electric resistance (positive temperature coefficient). The PTC-type resistance comprises a flexible laminar support made of thermo-resistant and electrically insulating material above which an electrically resistive material layer is applied, wherein the electrically resistive layer is made of ink printed on the support so as to form a plurality of tracks or trails as shown in FIG. 6 which are electrically supplied. The main feature of PTC is that the resistance value increases when temperature increases so as to limit the electric current, thereby preventing problems due to overheating. The electric resistance 62 is wound up inside the thermo-heating body 60 beginning with the first half 62a so that the first half 62a, which acts as an insulator for the PTC-type electric resistance 62b, is interposed between the thermo-heating body 60 and the PTC-type electric resistance 62b. In such a way a double electrical insulation is provided between the water circulating outside the thermo-heating body 60 and the PTC-type electric resistance 62b: the thermo-heating body 60 and the first half 62a.

From FIGS. 2, 3 and 7 one notes that a cylindrical pressing element 64 abuts upon the electric resistance 62 so forcing a continuous and uniform contact between the PTC-type electric resistance 62b and the inner surface of the thermo-heating body 60, thus obtaining an optimal thermal exchange.

From FIG. 2, it can be noted that the thermostat 66 is housed into the square end 60b of the thermo-heating body 60 and is electrically connected to the PTC-type electric resistance 62b and to the temperature sensor 68. The temperature sensor 68 is positioned near the square end 60b of the thermo-heating body 60 (see FIG. 3) and is interposed between the first half 62a and the second half 62b of the electric resistance 62 at a zone 74 (as shown in FIG. 6) that is, clear of the PTC-type electric resistance 62b. The sensor 68 is of the NTC-type (negative temperature coefficient), that is, a resistive element whose resistance value decreases when the temperature increases. The temperature controlling mechanism 70, as represented in FIG. 2, comprises a rotatable pin 80 essentially positioned in an axial manner with respect to the thermo-heating body 60 and having two opposite ends 80a,80b: a first end 80a which projects out of the closed end 60a of the thermo-heating body 60 and a second end 80b acting onto a trimmer 82 connected to the thermostat 66 so as to predetermine the required temperature for water. An O-ring gasket 84 is provided onto the first closed end 60a of the cylindrical and hollow body 60 where the rotatable pin 80 projects out of the thermo-heating body 60, in order to prevent water from coming inside.

From FIGS. 2, 3 and 4 one notes that the pump body 32 has a seat 90 for housing an electric supply 92 wire which enters into the body and is connected to the electric winding 44 of the statoric part 34 of the pump 24 and to the thermostat 66 which is electrically connected to the PTC-type electric resistance 62b. The housing 38 is entirely filled with liquid resin which incorporates the statoric part 34 of the pump 24 and the thermostat 66; subsequently, the pump body 32 and the thermo-heating body 60 are assembled by inserting the square end 60b of the thermo-heating body 60 inside the first housing 38 of the pump body 32 which is shaped so as to perfectly couple with the square end 60b. The resin solidifies and seals the pump body 32 with the thermo-heating body 60 preventing water from entering inside, so defining a sole sealing zone 100.

Figure 8:
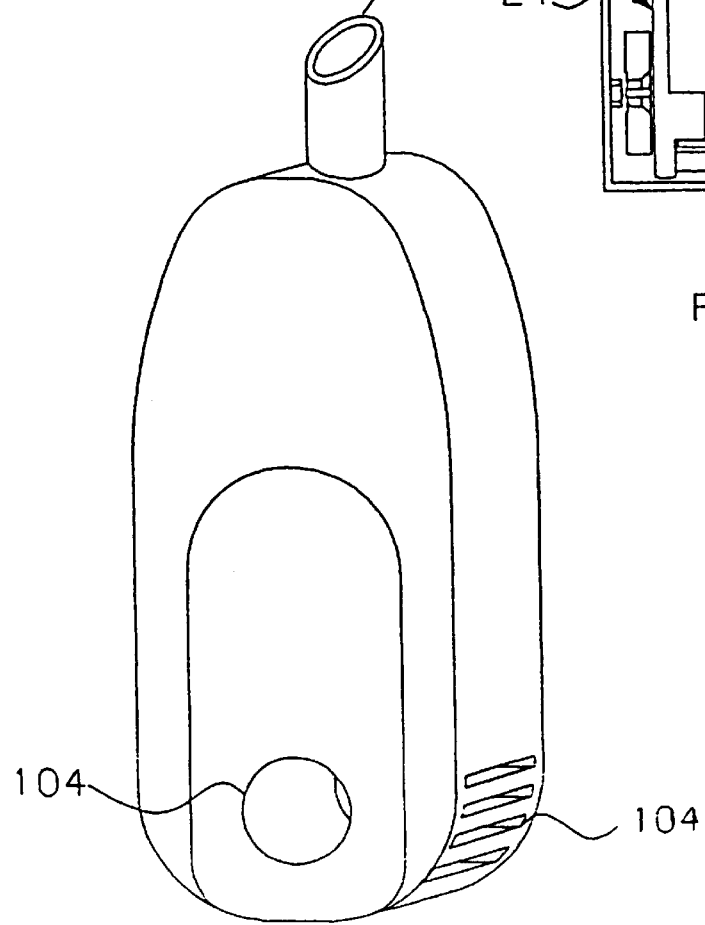
FIG. 8 is a perspective view of the casing.

From FIGS. 1 and 8, one can see that the casing 22 is essentially parallelepipedic and shaped so as to house not only the pump 24 and the thermo-heating element 26, but also to define a passage 102 to let the water flow between the casing and the thermo-heating body 60. The casing 22 has an opening 104 by which water is sucked in and an exit duct 106 from which pumped water comes out. From FIG. 1, it can be seen that a cartridge filter 72 made of porous material is interposed between the casing 22 and the thermo-heating body 60.

In order to use the device, it is sufficient to dip it in water and connect the electric supply wire 92 to an electric source. The pump 24 immediately starts up and makes water recirculate filtering it thanks to the cartridge filter 72, while the PTC-type electric resistance 62b operates when the sensor 68 signals a temperature of the water lower than the temperature predetermined by the thermostat 66 thanks to the control mechanism 70. Rotating the end 80a of the rotatable pin 80 the temperature predetermined by the thermostat 66 is controlled and the temperature of water is changed.

From the above disclosure, the simplicity of construction of the device is illustrated, particularly if one considers that the device can be supplied without the cartridge filter 72, with a predetermined temperature of the thermostat 66, and without the mechanism 70 for the control of the temperature. Optional use of the temperature control mechanism 70 permits increased versatility of device manufacture, whereas the use of the filter 72 makes the product more suitable and cheap for the market, for example for the domestic aquariums sold to children.

Another advantage is due to the fact that the temperature sensor 68 measures the temperature upstream of the thermo-heating element 26 with respect to the direction of the water flow and, consequently, it measures the real temperature of the aquarium water; furthermore, thanks to the clear zone 74 where the temperature sensor 68 is positioned, it is not thermically affected by the proximity of the thermo-heating element 26. Moreover, the device can be positioned in any position because the temperature sensor 68 measures always the same water temperature independently of its position. For example it is possible to use a different and larger casing which entirely encloses the device so as to house the cartridge filter within the device and said casing and provides a larger passage section 102 for water.

What is claimed is:

1. A device for pumping and heating liquids comprising:
    a pump;
    a thermoheating element including resistive means ; and
    a casing containing said pump and said thermoheating element;
    said thermoheating element further comprising a hollow thermoheating body wherein the resistive means is housed, a passage section for water defined between said thermo-heating body and said casing in order to exchange heat between the thermoheating element and the water, said pump further comprising a pump body, a statoric part of the pump housed in the pump body, wherein said pump body and said thermoheating body are integral and connected therebetween so as to form a sole sealed zone.

2. A device according to claim 1, wherein said resistive means comprises at least a PTC electric resistance.

3. A device according to claim 2, wherein said sealed zone houses a thermostatic element for selecting a predetermined temperature for water, and said sealed zone houses a thermometric sensor for measuring the temperature of water, said thermostatic element being electrically connected to said PTC electric resistance and to said thermometric sensor so as to maintain water at the predetermined temperature.

4. A device according to claim 3, wherein said thermometric sensor is an NTC resistive element.

5. A device according to claim 4, wherein said device further comprises a control mechanism operatingly connected to said thermostatic element to predetermine a temperature for water.

6. A device according to claim 5, wherein said control mechanism comprises a rotatable pin having a first end projecting from said thermoheating body and a second end acting on said thermostatic element so that rotating the first end affects a predetermined thermostatic temperature change.

7. A device according to claim 6, further comprising a sealing element interposed between said rotatable pin and said thermoheating body at a point where the rotatable pin projects from the thermoheating body.

8. A device according to claim 7, wherein said sealing element comprises at least one O-ring gasket.

9. A device according to claim 8, further comprising a sheet of an electrically insulating material interposed between an inner surface of said thermoheating body and said PTC electric resistance.

10. A device according to claim 9, further comprising a pressing element housed inside the thermoheating body and pressed against the PTC electric resistance so as to effect a uniform contact between said PTC electric resistance and an inner surface of said thermoheating body.

11. A device according to claim 10, wherein a filter is interposed between said thermoheating body and said casing.

12. A device according to claim 11, wherein said filter is a cartridge filter.

13. A device according to claim 3, wherein said thermostatic element is inserted in a resin.

14. A device according to claim 13, wherein said pump body and said thermoheating body are interpenetrated and said resin completely fills said pump body and defines an interpenetration zone between said pump body and said thermoheating body, thereby forming a seal and defining said sealed zone.

15. A method of heating and pumping liquids comprising the steps of: disposing the device according to claim 1 in an aquarium containing water; and pumping and heating the water using the device.

* * * * *

UNITED STATES PATENT AND TRADEMARK OFFICE
CERTIFICATE OF CORRECTION

PATENT NO.     : 6,565,330 B1
DATED          : May 20, 2003
INVENTOR(S)    : Valerio Bresolin It is certified that error appears in the above-identified patent and that said Letters Patent is hereby corrected as shown below:

<u>Title page,</u>
Item [30], Foreign Application Priority Data, delete
"Apr. 10, 2000     (IT)................................09/869076"
and replace with:
-- Dec. 24, 1998      (IT)……………………....VI 98A000242 --

Signed and Sealed this

Eleventh Day of May, 2004

JON W. DUDAS
*Acting Director of the United States Patent and Trademark Office*